Aug. 27, 1929. R. M. SEARLE 1,726,317
CARBURETED WATER GAS APPARATUS
Filed July 23, 1924 2 Sheets-Sheet 1

WITNESS:

INVENTOR
Robert M. Searle
BY
Augustus B Stoughton
ATTORNEY.

Aug. 27, 1929.  R. M. SEARLE  1,726,317
CARBURETED WATER GAS APPARATUS
Filed July 23, 1924   2 Sheets-Sheet 2

WITNESS:

INVENTOR
Robert M. Searle
BY
ATTORNEY

Patented Aug. 27, 1929.

1,726,317

UNITED STATES PATENT OFFICE.

ROBERT M. SEARLE, OF ROCHESTER, NEW YORK.

CARBURETED WATER-GAS APPARATUS.

Application filed July 23, 1924. Serial No. 727,627.

The principal object of the present invention is to prevent the discharge of dust, fine cinder and the like, into the atmosphere at carbureted water gas plants and works. Another object of the invention is not only to remove dust, as indicated, but also to insure improved carbureting results. Another object of the invention is to provide simple, efficient and reliable apparatus for the practice of the invention.

Other objects of the invention will appear from the following description at the end of which the invention will be claimed but it may be said that, generally stated, the invention consists in cleaning gas in its passage through a preheated internally unobstructed carbureter of generally cylindrical form by introducing gas through the cylindrical wall of the carbureter in downward and tangential direction and by leading off the clean gas from one end of the carbureter, advantageously in axial direction. The invention also comprises the improvements to be presently described and finally claimed.

In the following description reference will be made to the accompanying drawings forming part hereof and in which Figure 1 is an elevational view, partly in section and with parts broken away, of a water gas apparatus or set embodying features of the invention.

Figure 2:
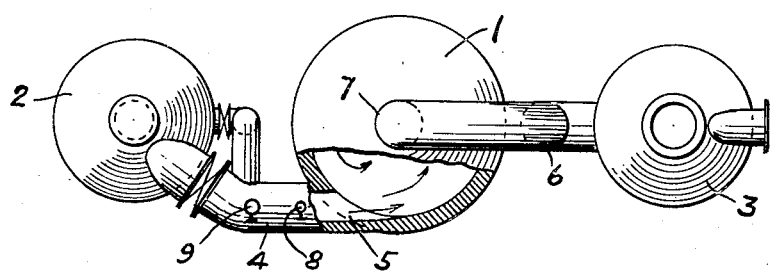
Fig. 2 is a top or plan view with parts broken away.
Figure 1:
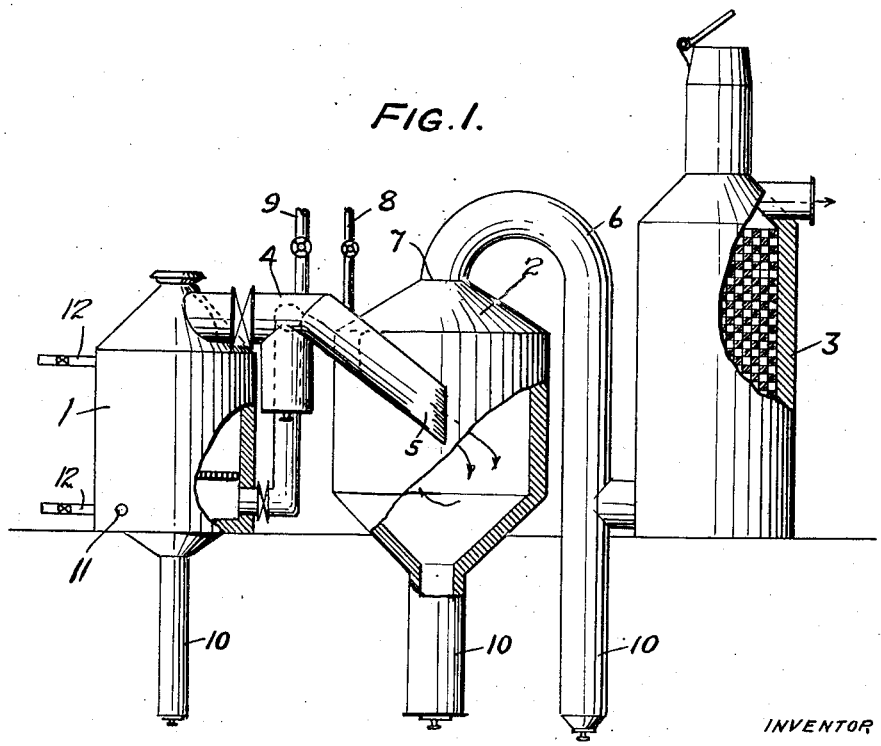
Figure 3:
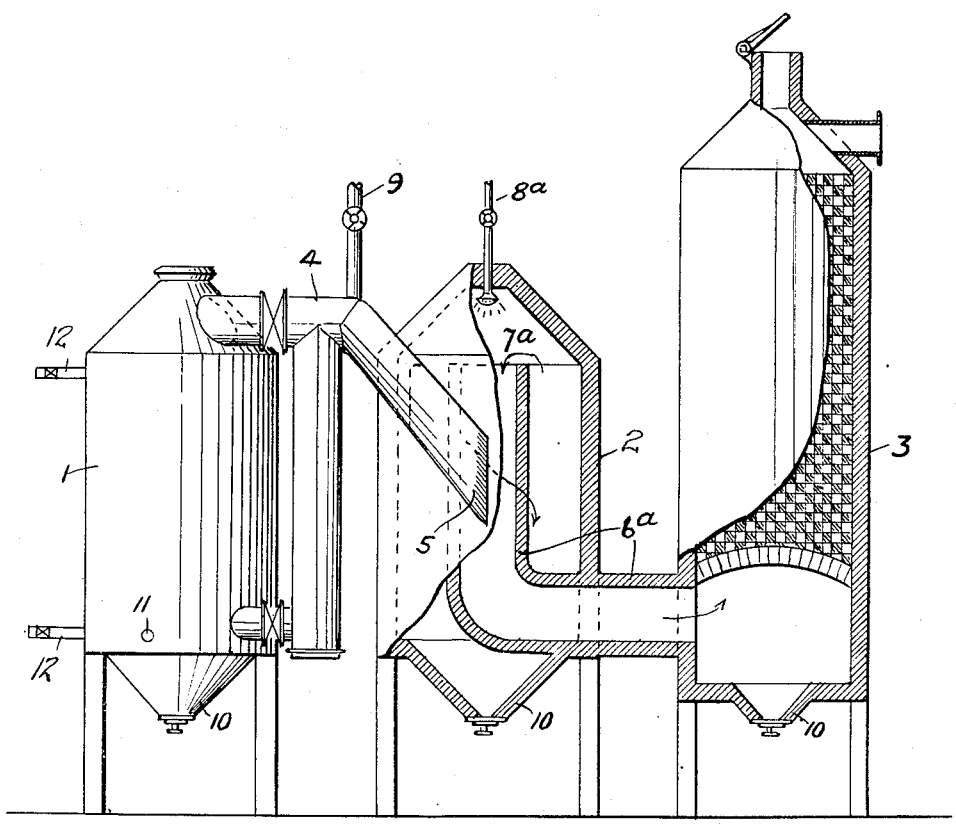
Fig. 3 is a view similar to Figure 2 and illustrating a modification.

In the drawings 2 is a carbureter of generally cylindrical form and it is internally unobstructed in the sense that it is not filled with or does not contain checker-brick. 1 is a water gas generator, and 3 is a superheater. 4 is a connection from the generator and it is provided with a tangential and downward discharge opening 5 provided through the cylindrical wall of the carbureter. There is also a connection to the superheater 3 from one of the ends of the chamber 2, and, as shown, it is provided with an axial intake opening from the carbureter or chamber 2 which is also a dust catcher. In Figs. 1 and 2 this connection to the superheater is indicated at 6, and its axial intake opening is indicated at 7. In Fig. 3 this connection is indicated at 6ª and its axial intake opening is indicated at 7ª. It will thus be observed that in Figs. 1 and 2 the direction of exit flow from the vessel 2 is upward, whereas in Fig. 3 it is downward. 8, Figs. 1 and 2, is an oil supply discharging into the connection 4 at the entrance to the chamber 2, and in Fig. 3, 8ª is an oil supply discharging directly into the chamber 1. 9 is a secondary air connection for the combustion of air blast gas made in the generator 1 for the purpose of internally preheating the chamber 2. 10 are dust pockets in which ash and fine cinder may collect and from which such collection may be removed.

11 is a valved air blast connection for the generator 1 and 12 indicates steam blast connections for the generator 1.

In the practice of the invention the downward and tangential introduction of the blast gas incident to the production of the water gas as well as the water gas to the carbureting chamber and the axial withdrawal of that gas from that chamber brings about a swirling movement and change of direction of the travel of the gas with the result that dust, ash and fine cinder drop down to the bottom of the chamber 2, and thus the gas is cleaned. Moreover in the case of water gas carbureted with oil the particles of oil dispersed through the water gas are carried toward and into contact with the cylindrical wall of the chamber 2, which improves the carburetion of the water gas.

It will be obvious to those skilled in the art that modifications may be made in details of construction and procedure without departing from the spirit of the invention which is not limited as to those matters or otherwise than as the prior art and the appended claims may require.

I claim:

1. A carbureted water gas apparatus having in combination; a water gas generator, an internally unobstructed cylindrical carbureter and dust catcher, a superheater, a gas conduit leading from the generator and having a downward and tangential outlet portion discharging through the cylindrical wall of the carbureter, and an axial gas conduit within the carbureter and leading to the superheater.

2. A carbureted water gas apparatus having in combination; a water gas generator, an internally unobstructed cylindrical carbureter and dust catcher, a superheater, a gas conduit leading from the generator and having a downward and tangential outlet portion discharging through the cylindrical wall of the carbureter, and an axial gas conduit leading from the interior of the carbureter to the superheater.

ROBERT M. SEARLE.